(12) United States Patent
Sheh et al.

(10) Patent No.: US 7,391,583 B1
(45) Date of Patent: Jun. 24, 2008

(54) FAULT TOLERANT SYNC MARK DETECTION WHILE SERVO WRITING A DISK DRIVE FROM SPIRAL TRACKS

(75) Inventors: Edgar D. Sheh, San Jose, CA (US); Tehri S. Lee, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 29 days.

(21) Appl. No.: 11/494,240

(22) Filed: Jul. 27, 2006

(51) Int. Cl.
*G11B 5/09* (2006.01)
*G11B 21/02* (2006.01)
*G11B 5/596* (2006.01)

(52) U.S. Cl. .............. 360/48; 360/51; 360/75; 360/77.08

(58) Field of Classification Search .............. None
See application file for complete search history.

(56) References Cited

U.S. PATENT DOCUMENTS

| | | | |
|---|---|---|---|
| 5,430,661 A | 7/1995 | Fisher et al. |
| 5,576,906 A | 11/1996 | Fisher et al. |
| 5,583,712 A | 12/1996 | Brunelle |
| 5,668,679 A | 9/1997 | Swearingen et al. |
| 5,696,639 A | 12/1997 | Spurbeck et al. |
| 5,754,353 A | 5/1998 | Behrens et al. |
| 5,761,212 A | 6/1998 | Foland, Jr. et al. |
| 5,831,888 A | 11/1998 | Glover |
| 5,838,512 A | 11/1998 | Okazaki |
| 5,917,670 A | 6/1999 | Scaramuzzo et al. |
| 6,021,012 A | 2/2000 | Bang |
| 6,023,386 A | 2/2000 | Reed et al. |
| 6,091,564 A | 7/2000 | Codilian et al. |
| 6,101,229 A | 8/2000 | Glover |
| 6,181,506 B1 | 1/2001 | Shimura et al. |
| 6,249,896 B1 | 6/2001 | Ho et al. |
| 6,272,194 B1 | 8/2001 | Sakamoto |
| 6,292,318 B1 | 9/2001 | Hayashi |
| 6,304,407 B1 | 10/2001 | Baker et al. |
| 6,411,452 B1 | 6/2002 | Cloke |
| 6,411,453 B1 | 6/2002 | Chainer et al. |
| 6,429,989 B1 | 8/2002 | Schultz et al. |

(Continued)

OTHER PUBLICATIONS

Office Action dated May 18, 2005 from U.S. Appl. No. 10/769,386, 5 pages.

(Continued)

*Primary Examiner*—K. Wong
(74) *Attorney, Agent, or Firm*—Howard H. Sheerin, Esq.

(57) ABSTRACT

A method of writing product servo sectors to a disk of a disk drive is disclosed. The disk comprises a plurality of spiral tracks, wherein each spiral track comprises a high frequency signal interrupted at a predetermined interval by a sync mark. The read signal from the head is processed to detect a plurality of the sync marks in a spiral track crossing. A timing recovery measurement is generated in response to a selected one of the sync marks based on reliability metrics, wherein a servo write clock is synchronized in response to the timing recovery measurement. The read signal representing the high frequency signal in the spiral track crossing is processed to generate a position error signal (PES) used to maintain the head along a substantially circular target path while using the servo write clock to write product servo sectors along the circular target path.

16 Claims, 17 Drawing Sheets

U.S. PATENT DOCUMENTS

| | | |
|---|---|---|
| 6,487,032 B1 | 11/2002 | Cloke et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,603,622 B1 | 8/2003 | Christiansen et al. |
| 6,704,156 B1 | 3/2004 | Baker et al. |
| 6,738,205 B1 | 5/2004 | Moran et al. |
| 6,791,777 B2 | 9/2004 | Watanabe et al. |
| 6,882,486 B1 | 4/2005 | Kupferman |
| 6,943,978 B1 * | 9/2005 | Lee ............................ 360/75 |
| 6,965,489 B1 | 11/2005 | Lee et al. |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,016,134 B1 | 3/2006 | Agarwal et al. |
| 7,023,631 B2 | 4/2006 | Zhang et al. |
| 7,054,083 B2 | 5/2006 | Ehrlich |
| 7,068,459 B1 * | 6/2006 | Cloke et al. ................... 360/75 |
| 7,068,461 B1 | 6/2006 | Chue et al. |
| 7,088,533 B1 | 8/2006 | Shepherd et al. |
| 7,212,364 B1 | 5/2007 | Lee |
| 2001/0010604 A1 | 8/2001 | Esumi |
| 2003/0030929 A1 | 2/2003 | Ozdemir |

OTHER PUBLICATIONS

Office Action dated Aug. 22, 2005, from U.S. Appl. No. 10/769,386, 9 pages.

Notice of Allowance dated Mar. 23, 2006, from U.S. Appl. No. 10/769,386, 7 pages.

Office Action dated Jul. 17, 2006, from U.S. Appl. No. 10/769,386, 9 pages.

Notice of Allowance dated Feb. 7, 2007, from U.S. Appl. No. 10/769,386, 10 pages.

* cited by examiner

FAULT TOLERANT SYNC MARK DETECTION WHILE SERVO WRITING A DISK DRIVE FROM SPIRAL TRACKS

CROSS REFERENCE TO RELATED PATENTS AND PATENT APPLICATIONS

This application is related to co-pending U.S. patent application Ser. No. 10/769,386 entitled "SERVO WRITING A DISK DRIVE BY SYNCHRONIZING A SERVO WRITE CLOCK IN RESPONSE TO A SYNC MARK RELIABILITY METRIC" filed on Jan. 31, 2004 the disclosure of which is incorporated herein by reference.

BACKGROUND OF THE INVENTION

1. Field of the Invention

The present invention relates to disk drives for computer systems. More particularly, the present invention relates to fault tolerant sync mark detection while servo writing a disk drive from spiral tracks.

2. Description of the Prior Art

When manufacturing a disk drive, product servo sectors $2_0$-$2_7$ are written to a disk 4 which define a plurality of radially-spaced, concentric data tracks 6 as shown in the prior art disk format of FIG. 1. Each product servo sector (e.g., servo sector 24) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation the servo bursts 14 are processed by the disk drive in order to maintain a head over a centerline of a target track while writing or reading data. In the past, external servo writers have been used to write the product servo sectors $2_0$-$2_7$ to the disk surface during manufacturing. External servo writers employ extremely accurate head positioning mechanics, such as a laser interferometer, to ensure the product servo sectors $2_0$-$2_7$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks. However if the signal-to-noise ratio (SNR) of the read signal is low (e.g., over a media defect), a missing bit may be falsely detected at the wrong time creating transients in the PLL which degrades the servo writing process.

There is, therefore, a need to better synchronize a servo write clock when servo writing a disk drive by servoing on spiral tracks.

SUMMARY OF THE INVENTION

An embodiment of the present invention comprises a method of writing product servo sectors to a disk of a disk drive. The disk drive comprises control circuitry and a head disk assembly (HDA) comprising the disk, an actuator arm, a head connected to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal, and the read signal is processed to detect a plurality of the sync marks in a spiral track crossing. One out of the plurality of detected sync marks is selected based on a reliability of the detected sync marks, and a timing recovery measurement is generated in response to the selected sync mark, wherein a servo write clock is synchronized in response to the timing recovery measurement. The read signal representing the high frequency signal in the spiral track crossing is processed to generate a position error signal (PES) used to maintain the head along a substantially circular target path while using the servo write clock and the head internal to the disk drive to write the product servo sectors along the circular target path.

In one embodiment, if two sync marks are detected in the spiral track crossing, the sync mark that generates the highest amplitude read signal is selected as having the high reliability. In another embodiment, if three sync marks are detected in the spiral track crossing, the second sync mark is selected as having the high reliability. In yet another embodiment, if four sync marks are detected in the spiral track crossing, a timing recovery measurement is generated for at least the second and third sync marks, and one of the second and third sync marks is selected as having the high reliability based on the timing recovery measurements. In one embodiment, the sync mark that generates the minimum timing recovery measurement is selected as having the high reliability.

Another embodiment of the present invention comprises a disk drive including a disk comprising a plurality of spiral tracks, wherein each spiral track comprises a high frequency signal interrupted at a predetermined interval by a sync mark, an actuator arm, a head connected to a distal end of the actuator arm, and a voice coil motor for rotating the actuator arm about a pivot to position the head radially over the disk. Control circuitry within the disk drive writes a plurality of product servo sectors to the disk to define a plurality of radially spaced, concentric data tracks by:

using the head internal to the disk drive to read the spiral tracks to generate a read signal;

processing the read signal to detect a plurality of the sync marks in a spiral track crossing;

selecting one out of the plurality of detected sync marks based on a reliability of the detected sync marks;

generating a timing recovery measurement in response to the selected sync mark;

synchronizing a servo write clock in response to the timing recovery measurement;

processing the read signal representing the high frequency signal in the spiral track crossing to generate a position error signal (PES) used to maintain the head along a substantially circular target path; and using the servo write clock and the head internal to the disk drive to write the product servo sectors along the circular target path.

Another embodiment of the present invention comprises a method of writing product servo sectors to a disk of a disk drive. The disk drive comprises control circuitry and a head disk assembly (HDA) comprising the disk, an actuator arm, a head connected to a distal end of the actuator arm, and a voice coil motor for rotating the actuator arm about a pivot to position the head radially over the disk. The disk comprises a plurality of spiral tracks, wherein each spiral track comprises a high frequency signal interrupted at a predetermined interval by a sync mark. The head internal to the disk drive is used to read the spiral tracks to generate a read signal, and the read signal is processed to detect a plurality of the sync marks in a spiral track crossing. A plurality of timing recovery measurements are generated corresponding to the plurality of the detected sync marks. The plurality of timing recovery measurements are filtered to generate a filtered timing recovery measurement, wherein a servo write clock is synchronized in response to the filtered timing recovery measurement. The read signal representing the high frequency signal in the spiral track crossing is processed to generate a position error signal (PES) used to maintain the head along a substantially circular target path while using the servo write clock and the head internal to the disk drive to write the product servo sectors along the circular target path.

Another embodiment of the present invention comprises a disk drive including a disk comprising a plurality of spiral tracks, wherein each spiral track comprises a high frequency signal interrupted at a predetermined interval by a sync mark, an actuator arm, a head connected to a distal end of the actuator arm, and a voice coil motor for rotating the actuator arm about a pivot to position the head radially over the disk. Control circuitry within the disk drive writes a plurality of product servo sectors to the disk to define a plurality of radially spaced, concentric data tracks by:
  using the head internal to the disk drive to read the spiral tracks to generate a read signal;
  processing the read signal to detect a plurality of the sync marks in a spiral track crossing;
  generating a plurality of timing recovery measurements corresponding to the plurality of detected sync marks;
  filtering the plurality of timing recovery measurements to generate a filtered timing recovery measurement;
  synchronizing a servo write clock in response to the filtered timing recovery measurement;
  processing the read signal representing the high frequency signal in the spiral track crossing to generate a position error signal (PES) used to maintain the head along a substantially circular target path; and
  using the servo write clock and the head internal to the disk drive to write the product servo sectors along the circular target path.

DESCRIPTION OF THE PREFERRED EMBODIMENTS

An embodiment of the present invention comprises a method of writing product servo sectors to a disk of a disk drive. The disk comprises a plurality of spiral tracks, wherein each spiral track comprises a high frequency signal interrupted at a predetermined interval by a sync mark. The read signal from the head is processed to detect a plurality of the sync marks in a spiral track crossing. One out of the plurality of detected sync marks is selected based on a reliability of the detected sync marks, and a timing recovery measurement is generated in response to the selected sync mark, wherein a servo write clock is synchronized in response to the timing recovery measurement. The read signal representing the high frequency signal in the spiral track crossing is processed to generate a position error signal (PES) used to maintain the head along a substantially circular target path while using the servo write clock to write product servo sectors along the circular target path.

Figure 2B:
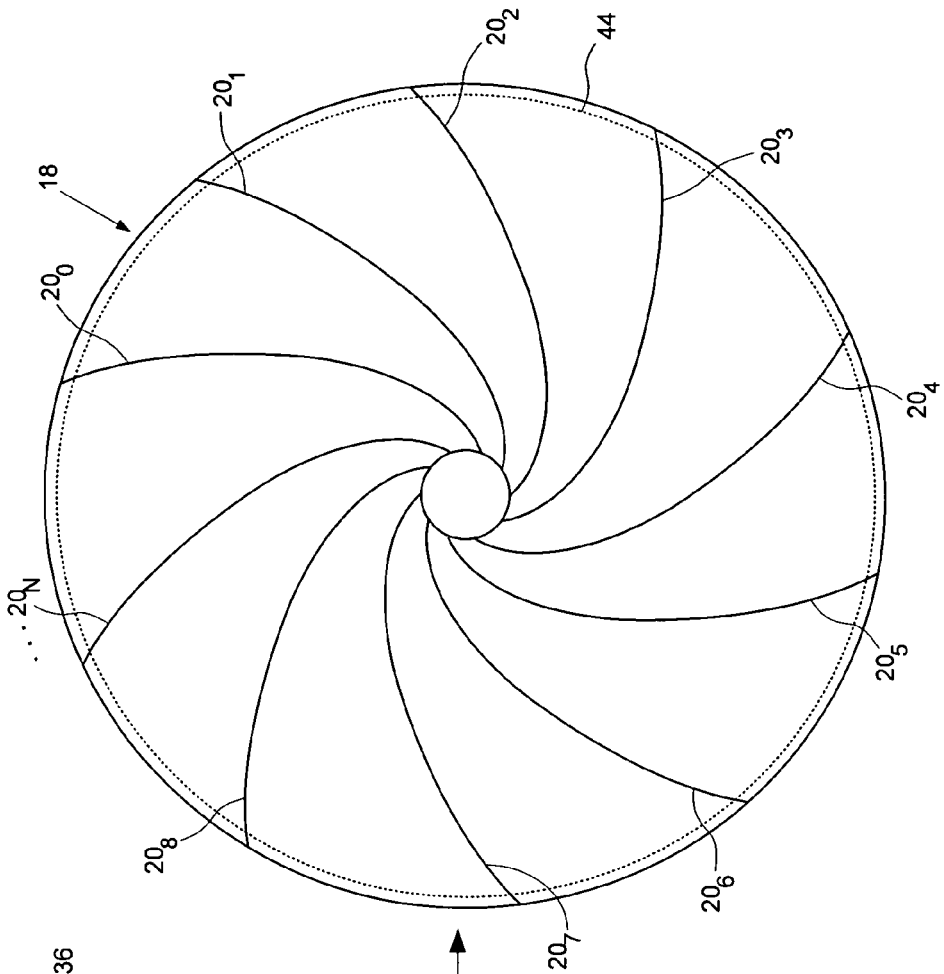
FIGS. 2A and 2B illustrate an embodiment of the present invention wherein an external spiral servo writer is used to write a plurality of spiral tracks to the disk for use in writing product servo sectors to the disk.
Figure 2A:
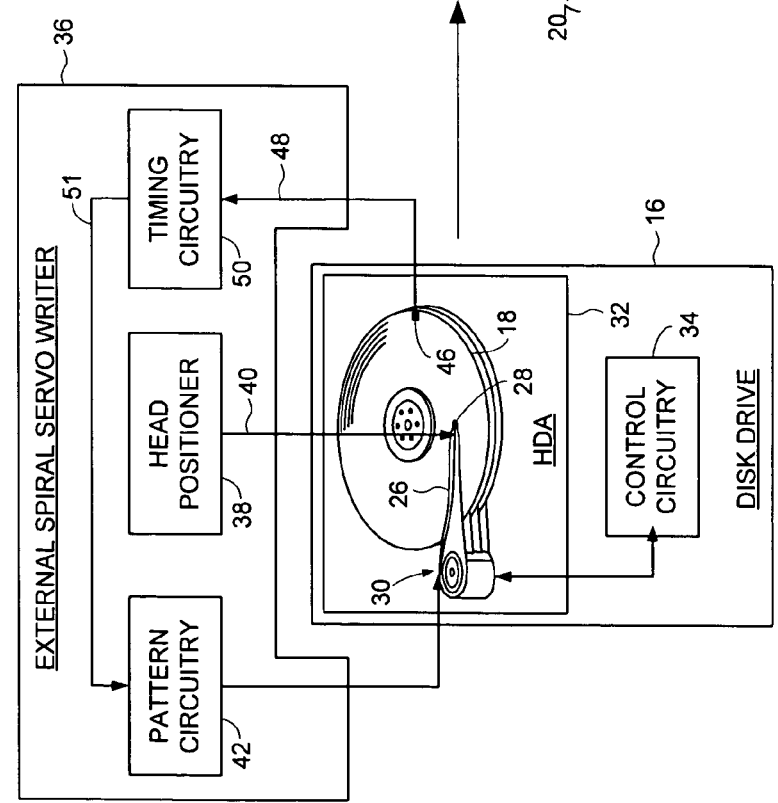

The spiral tracks may comprise any suitable pattern and may be written to the disk using any suitable technique, such as using an external writer for writing the spiral tracks to the disk, or stamping the spiral tracks on the disk using magnetic printing techniques. FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 3:
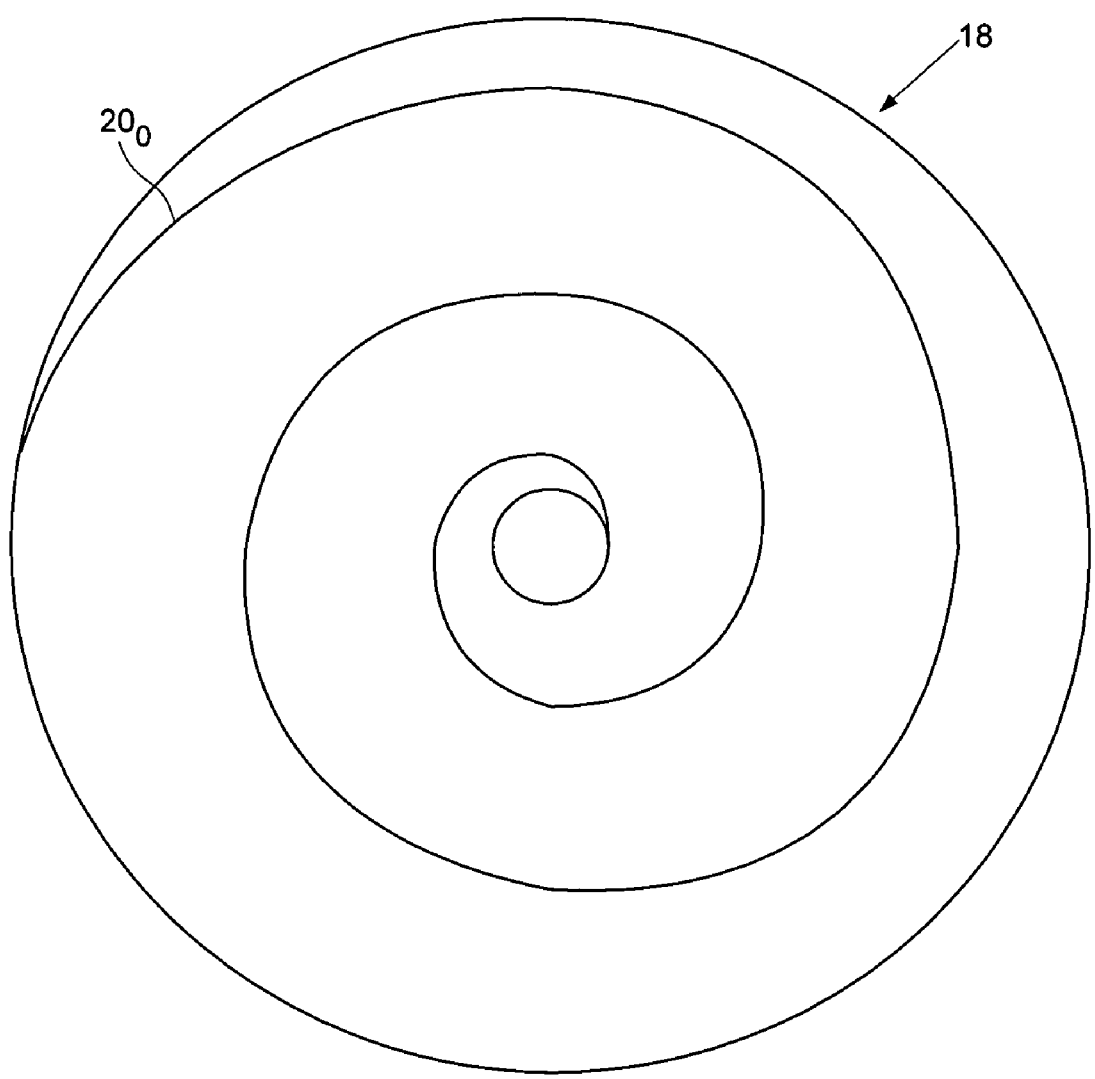
FIG. 3 illustrates an embodiment of the present invention wherein each spiral track is written over multiple revolutions of the disk.

In the embodiment of FIG. 2B, each spiral track $20_i$ is written over a partial revolution of the disk 18. In an alternative embodiment, each spiral track $20_i$ is written over one or more revolutions of the disk 18. FIG. 3 shows an embodiment wherein each spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18 during a "fill operation".

Figure 4A:
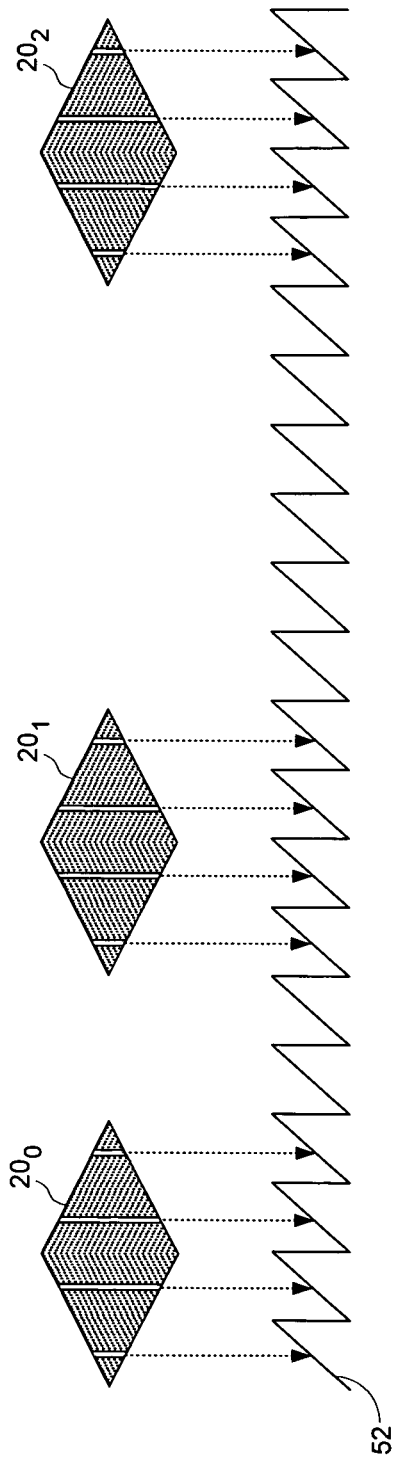
FIG. 4A shows an embodiment of the present invention wherein a servo write clock is synchronized by clocking a modulo-N counter relative to when the sync marks in the spiral tracks are detected.
Figure 4B:
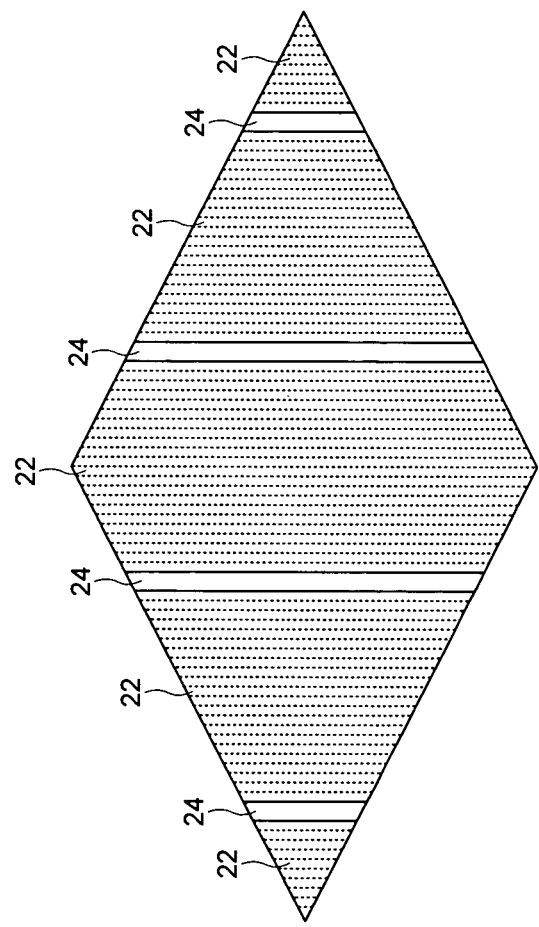
FIG. 4B shows an eye pattern generated by reading the spiral track, including the sync marks in the spiral track.

FIG. 4B illustrates an "eye" pattern in the read signal that is generated when the head 28 crosses over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the plurality of sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

Figure 1:
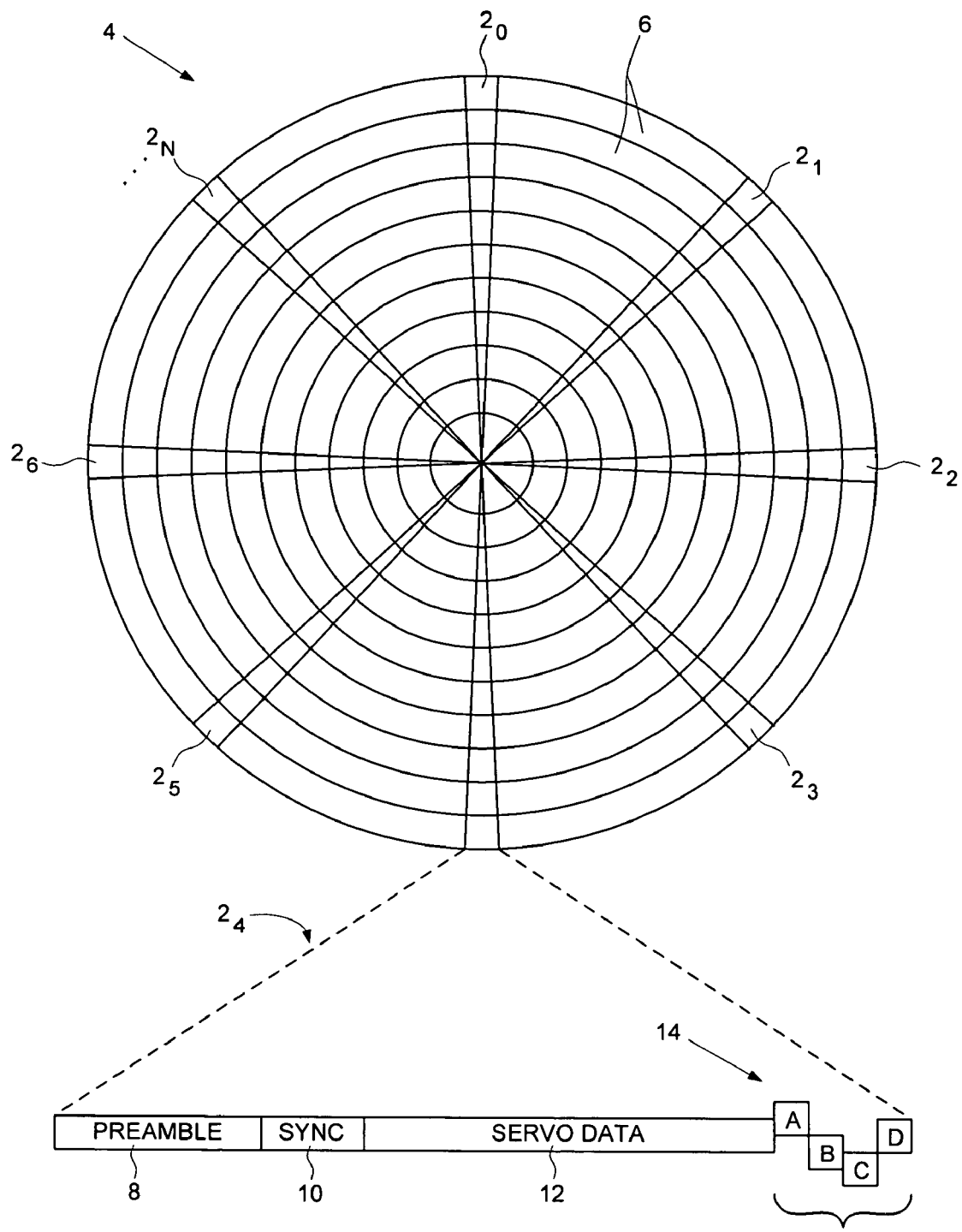
FIG. 1 shows a prior art disk format comprising a plurality of radially spaced, concentric tracks defined by a plurality of product servo sectors.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
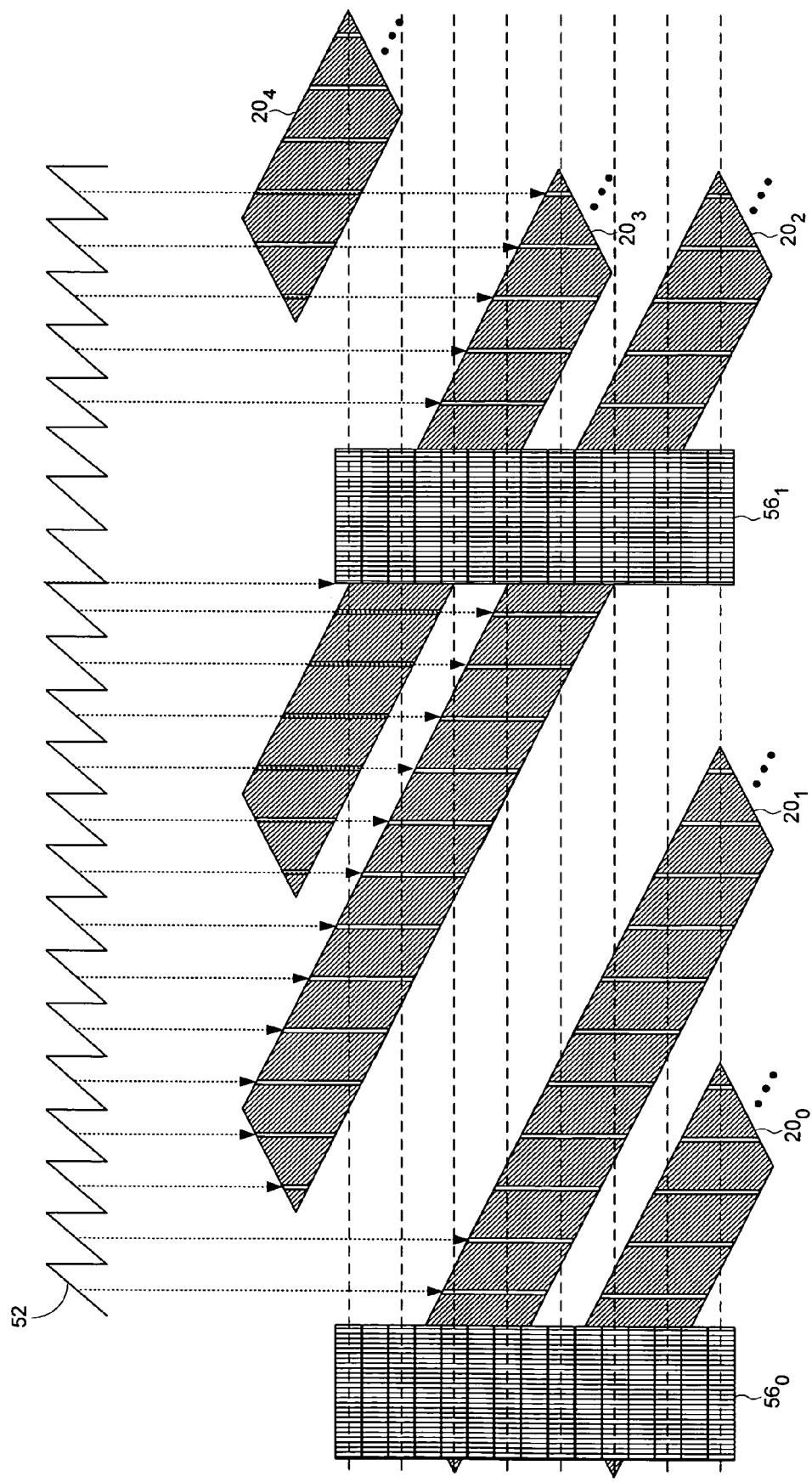
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Figure 6A:
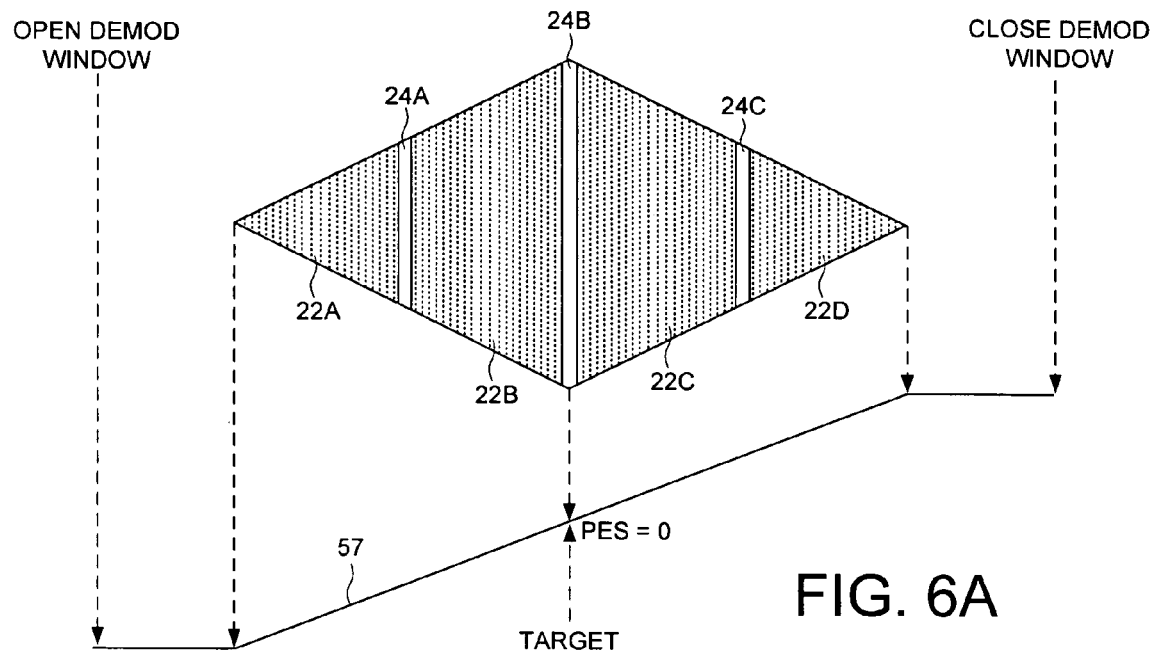
FIG. 6A illustrates an embodiment of the present invention wherein the high frequency signal in the spiral tracks is demodulated by integrating the read signal over a demodulation window and generating the PES relative to a target sync mark and a reference point on the resulting ramp signal.
Figure 6B:
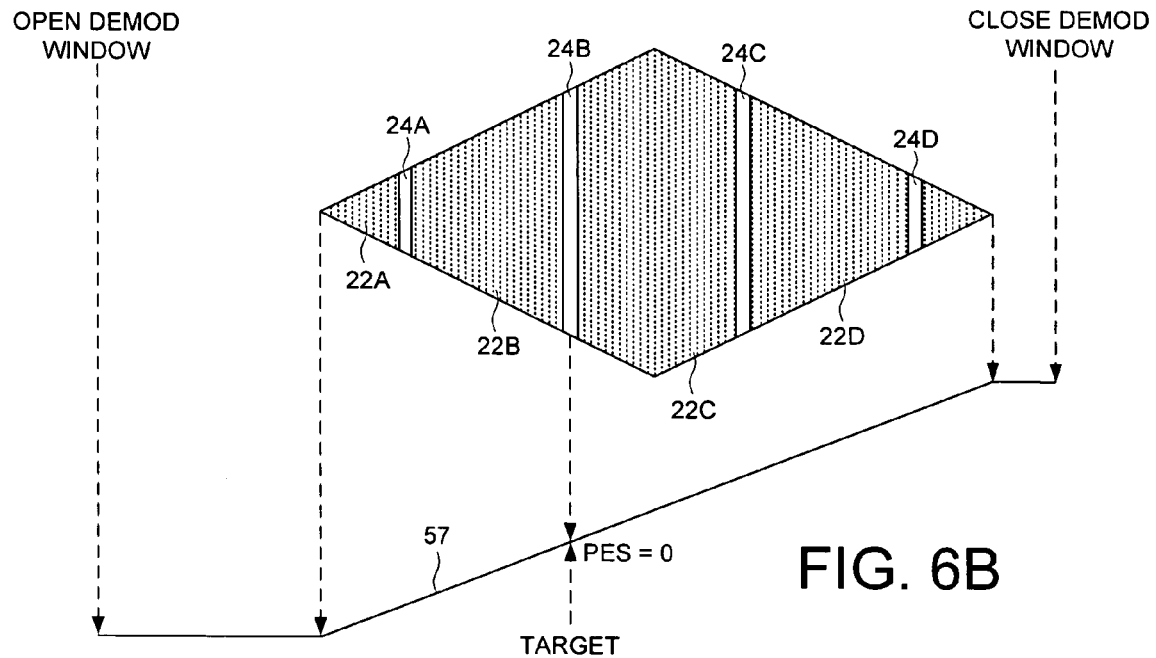
FIG. 6B illustrates initiating a seek operation by shifting the demodulation window an integer number of sync marks to generate a non-zero PES.

FIGS. 6A and 6B show an embodiment of the present invention for increasing the resolution of the track density when demodulating the high frequency signal in the spiral tracks to generate a ramp signal 57. FIG. 6A illustrates a tracking operation on a first servo track by generating the position error signal relative to a target sync mark 24B and a reference point of the ramp signal 57 (e.g., the center of the ramp signal 57), and FIG. 6B illustrates a seek to a next servo track by adjusting the reference point of the ramp signal 57. Note that the track density can be increased to essentially any resolution by appropriately adjusting the reference point of the ramp signal 57. Note also that the number of sync marks 24 in each spiral track crossing may vary depending on the target radial location of the head (e.g., three sync marks 24 in the spiral track crossing of FIG. 6A and four sync marks 24 in the spiral track crossing of FIG. 6B).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors 56, to the disk, spiral track 202 is processed initially to generate the PES tracking error and the timing recovery measurement. When the product servo sectors 56, begin to overwrite spiral track 202, spiral track 203 is processed to generate the PES tracking error and the timing recovery measurement.

Figure 7:
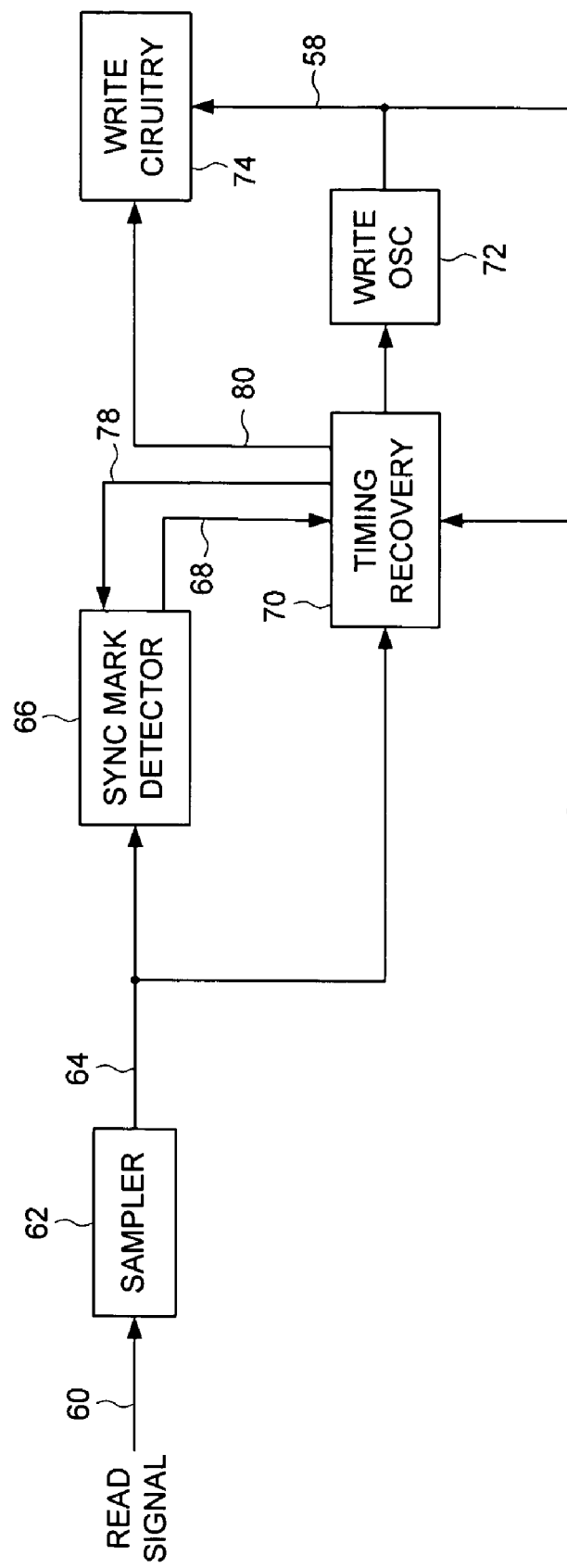
FIG. 7 shows circuitry according to an embodiment of the present invention for generating the servo write clock.

FIG. 7 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_0$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$-$20_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8A:
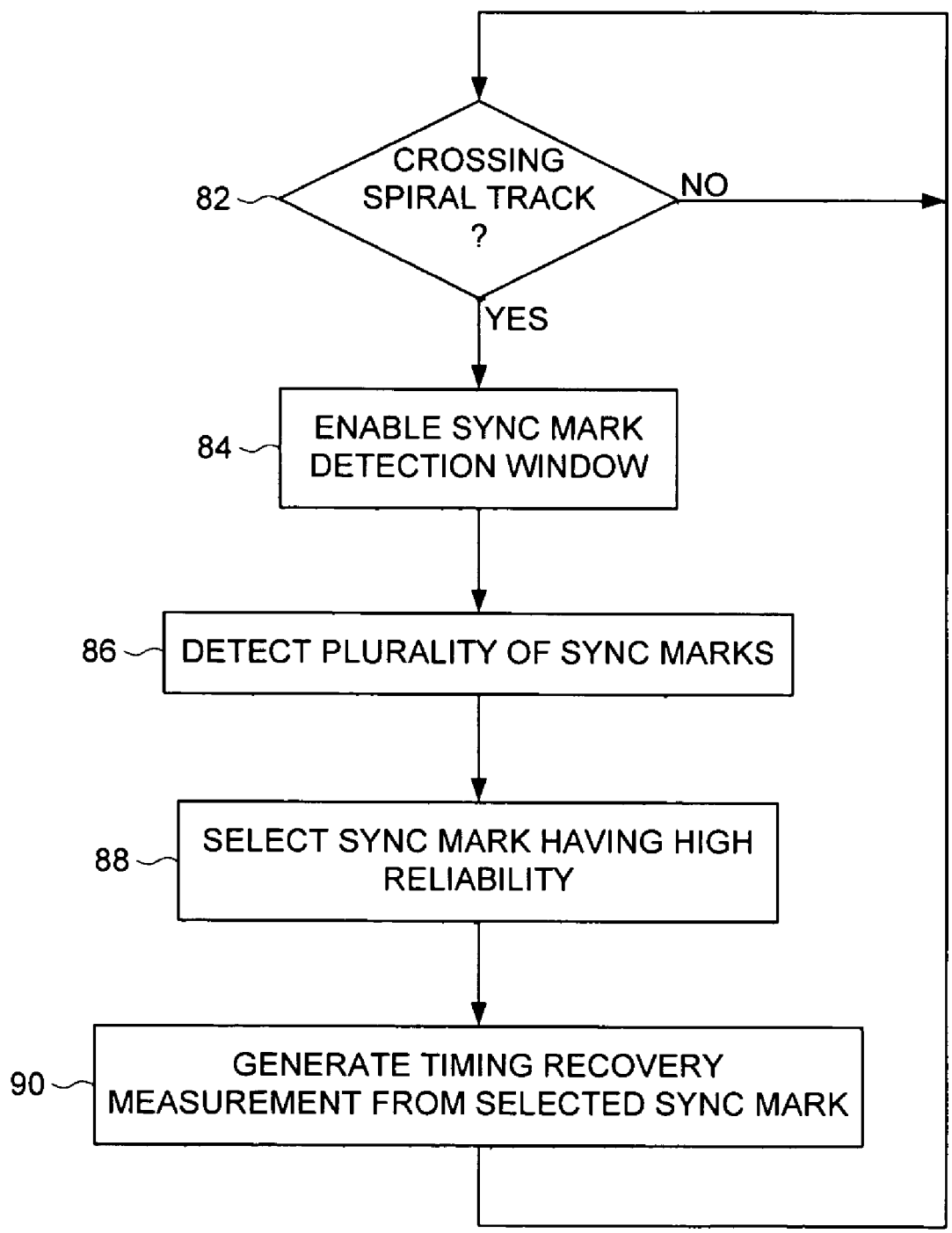
FIG. 8A is a flow diagram according to an embodiment of the present invention wherein for each spiral track crossing a sync mark having a high reliability is selected to generate the timing recovery measurement used to synchronize the servo write clock.

FIG. 8A is a flow diagram according to an embodiment of the present invention wherein for each spiral track crossing a sync mark having a high reliability is selected to generate the timing recovery measurement used to synchronize the servo write clock. When the head crosses a spiral track at step 82, the timing recovery circuit 70 enables the sync mark detection window at step 84 during each window where a sync mark 24 is expected to occur. At step 86 a plurality of sync marks in the spiral track crossing are detected, and at step 88 the sync mark having a high reliability is selected out of the plurality of detected sync marks. At step 90, the timing recovery measurement for synchronizing the servo write clock is generated in response to the selected sync mark.

Figure 8B:
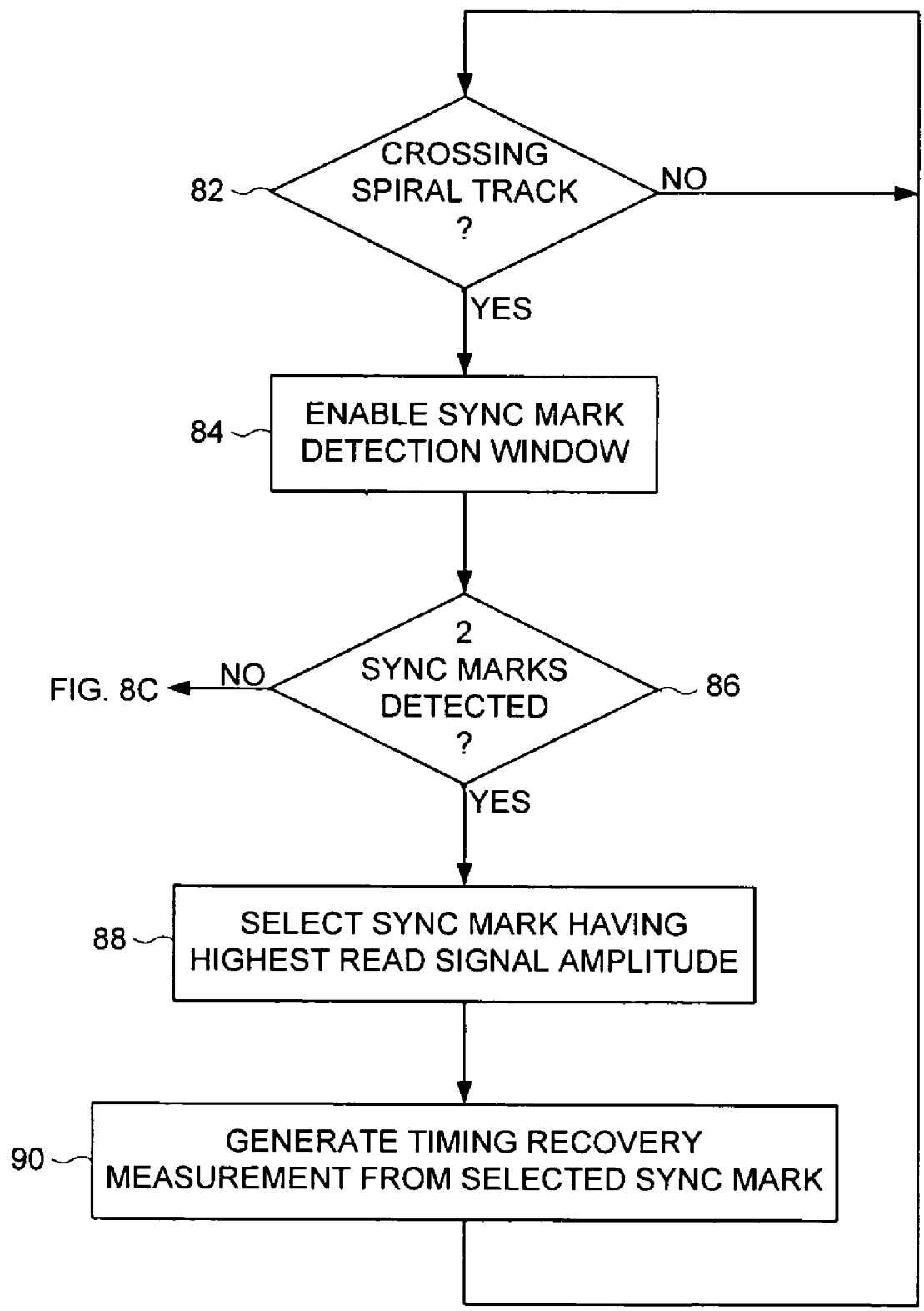
FIG. 8B is a flow diagram according to an embodiment of the present invention wherein if two sync marks are detected in a spiral track crossing, the sync mark that generates the highest read signal amplitude is selected to generated the timing recovery measurement.

FIG. 8B is a flow diagram according to an embodiment of the present invention wherein if at step 86 two sync marks are detected, then at step 88 the sync mark that generates the highest amplitude read signal is selected as having the high reliability. Referring to FIG. 6B, the signal quality of the read signal may be so poor that the end sync marks 24A and 24D are undetectable. If so, the sync mark 24B or 24C that generates the highest amplitude read signal is selected as having the high reliability and therefore used to generate the timing recovery measurement.

Figure 8C:
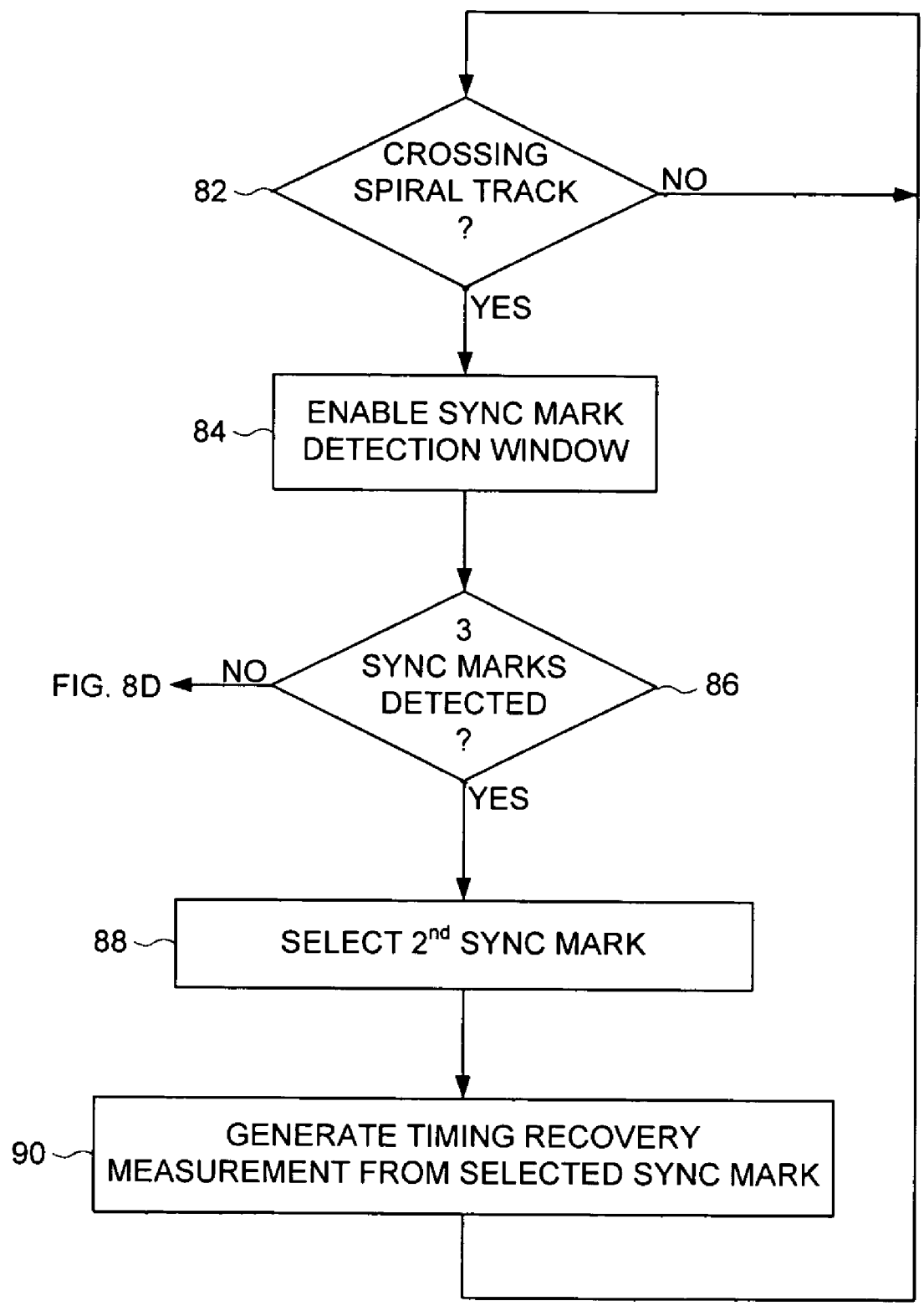
FIG. 8C is a flow diagram according to an embodiment of the present invention wherein if three sync marks are detected in a spiral track crossing, the second sync mark is selected to generated the timing recovery measurement.

FIG. 8C is a flow diagram according to an embodiment of the present invention wherein if at step 86 three sync marks are detected, then at step 88 the second sync mark is selected as having the high reliability. Referring to FIG. 6A, if three sync marks are detected the second sync mark 24B is considered most reliable since it will typically have the highest signal quality.

Figure 8D:
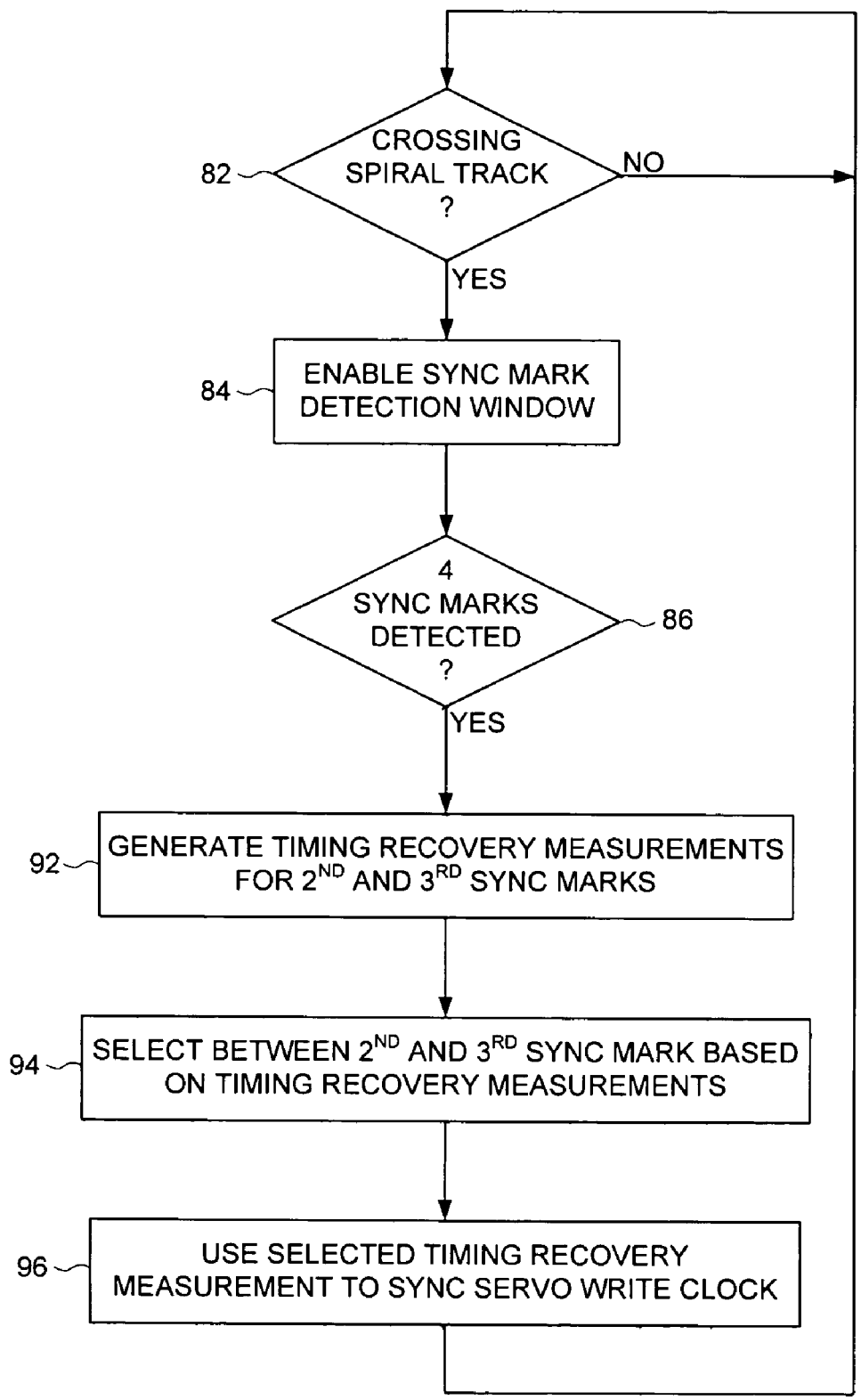
FIG. 8D is a flow diagram according to an embodiment of the present invention wherein if four sync marks are detected in a spiral track crossing, the second or third sync mark that generates the minimum phase error is selected to generate the timing recovery measurement.

FIG. 8D is a flow diagram according to an embodiment of the present invention wherein if at step 86 four sync marks are detected, then at step 92 a timing recovery measurement is generated for at least the second and third sync marks, and at step 94 one of the second and third sync marks is selected as having the high reliability based on the timing recovery measurements. For example, in one embodiment the sync mark that generates the minimum timing recovery measurement is selected as having the high reliability for use in synchronizing the servo write clock at step 96.

In one embodiment, the sync mark having the high reliability is selected to generate the timing recovery measurement only if all of the sync marks in a spiral track crossing have a signal quality that falls below a predetermined threshold. If the signal quality of any one of the sync marks exceeds the threshold, it is used to generate the timing recovery measurement regardless as to the signal quality of the other sync marks. The signal quality may be measured in any suitable manner, such as measuring the amplitude of the read signal or measuring the mean squared error (MSE) between the read signal samples and expected samples representing the sync mark. Further details of this embodiment are disclosed in the above referenced co-pending patent application entitled "SERVO WRITING A DISK DRIVE BY SYNCHRONIZING A SERVO WRITE CLOCK IN RESPONSE TO A SYNC MARK RELIABILITY METRIC".

Figure 8E:
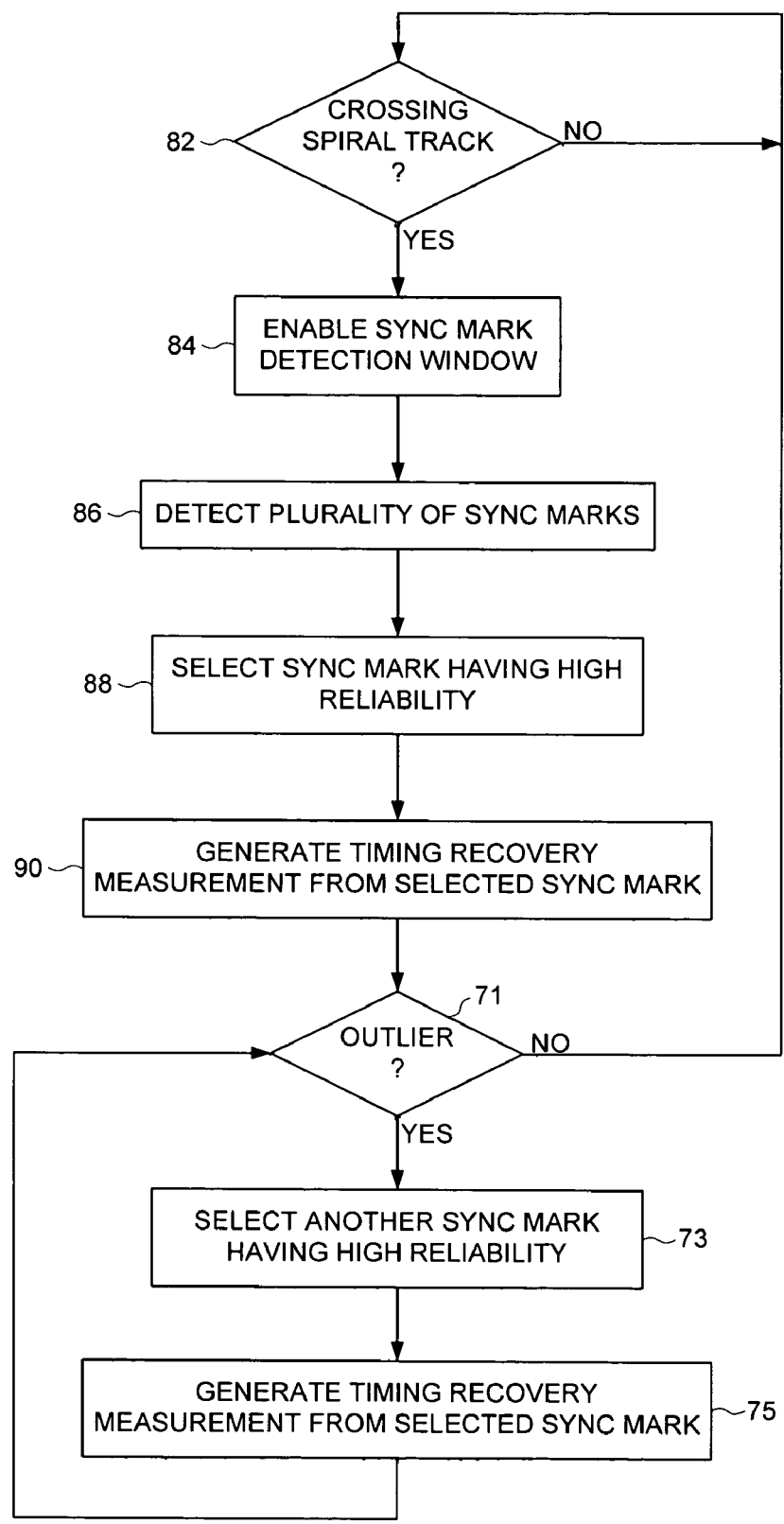
FIG. 8E is a flow diagram according to an embodiment of the present invention wherein if the timing recovery measurement generated from the selected sync mark exceeds a predetermined threshold, it is discarded and another sync mark is selected for generating the timing recovery measurement.

In another example embodiment shown in the flow diagram of FIG. 8E, if at step 71 the timing recovery measurement generated from the selected sync mark exceeds a predetermined threshold, it is considered an outlier. If so, another of the sync marks having a high reliability is selected at step 73, and at step 75 another timing recovery measurement is generated. This process repeats until a sync mark is selected that generates an acceptable timing recovery measurement. If the timing recovery measurement exceeds the threshold at step 71 for all of the sync marks in a spiral track crossing, then in one embodiment the minimum timing recovery measurement is selected.

Figure 9A:
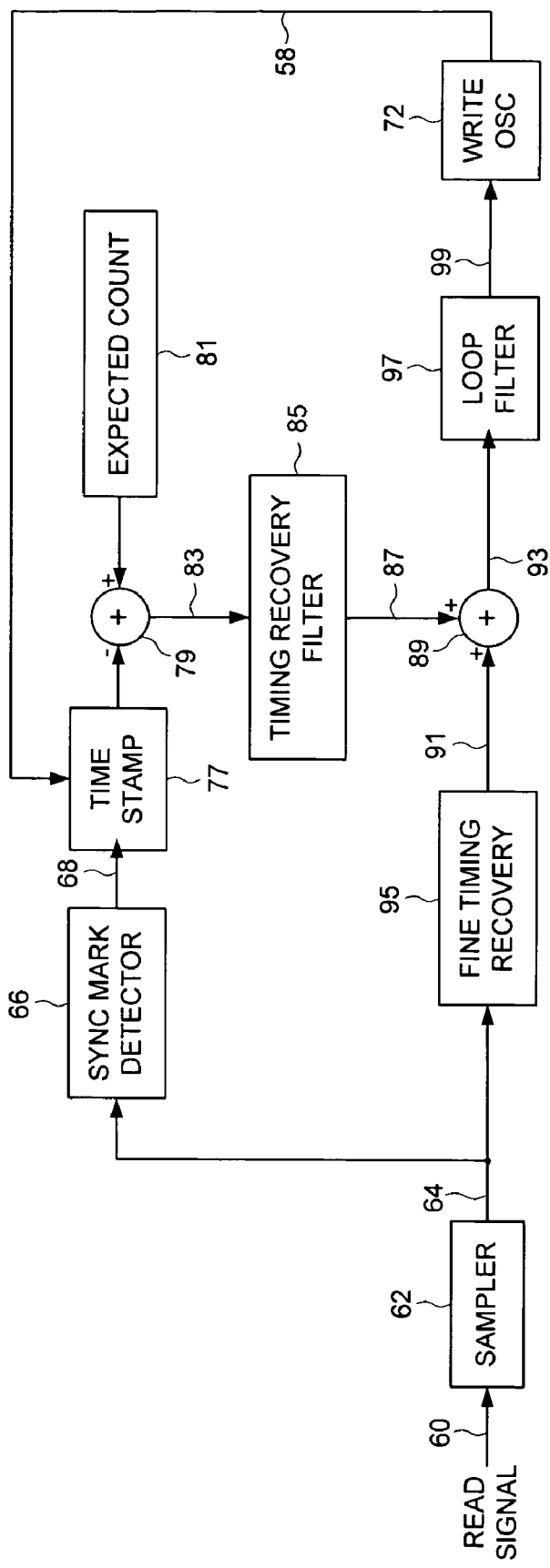
FIG. 9A shows an embodiment of the present invention wherein the timing recovery measurements generated from a plurality of the sync marks are filtered to generate a filtered timing recovery measurement combined with a fine timing recovery measurement.

FIG. 9A shows details of timing recovery circuitry for synchronizing the servo write clock 58 according to an example embodiment of the present invention. The sync mark detector 66 generates a sync mark detect signal 68 applied to a time stamp circuit 77 comprising the modulo-N counter clocked by the servo write clock 58. The time stamp circuit 77 outputs the value of the modulo-N counter as each sync mark is detected which is subtracted 79 from an expected count 81 to generate the coarse timing recovery measurement 83. A timing recovery filter 85 filters the coarse timing recovery measurements 83 to generate a filtered timing recovery measurement 87. The timing recovery filter 85 may comprise any suitable circuitry, such as an averaging circuit, a weighted averaging circuit, a finite impulse response filter, a state estimator, etc.. The filtered timing recovery measurement 87 is combined 89 with a fine timing recovery measurement 91 to generate a combined timing recovery measurement 93, wherein the fine timing recovery measurement 91 is generated by a fine timing recovery circuit 95 in response to the read signal samples 64 representing the high frequency signal 22 in the spiral tracks crossing. The combined timing recovery measurement 93 is applied to a suitable PLL loop filter 97, wherein the output 99 of the loop filter 97 is applied to the write oscillator 72 which outputs the servo write clock 58.

Figure 9B:
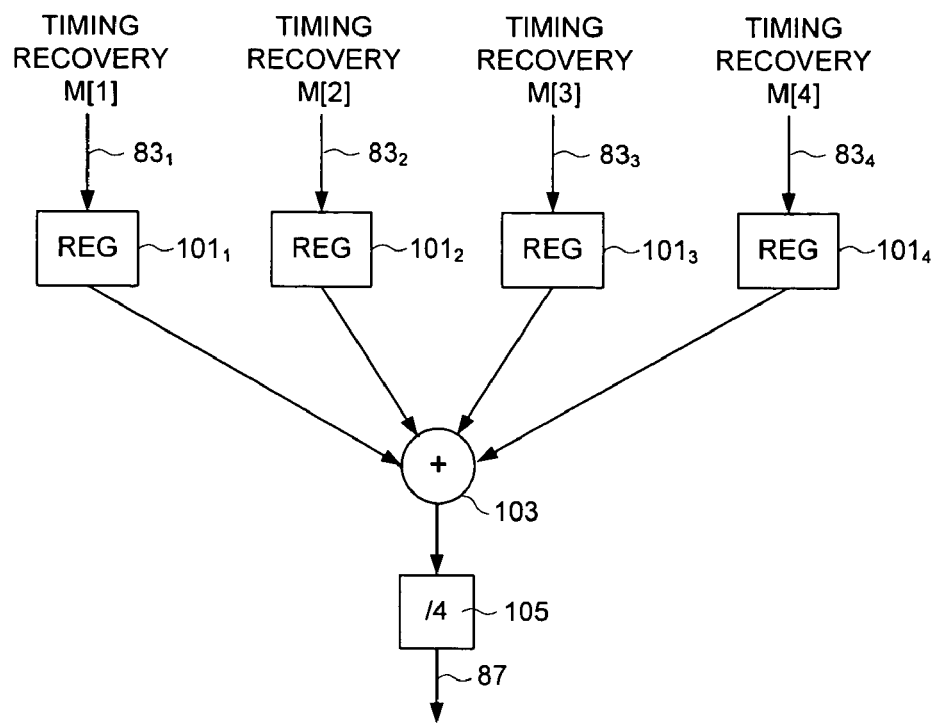
FIG. 9B shows an embodiment of the present invention wherein the timing recovery measurements generated for the sync marks in a spiral track crossing are averaged.
Figure 9C:
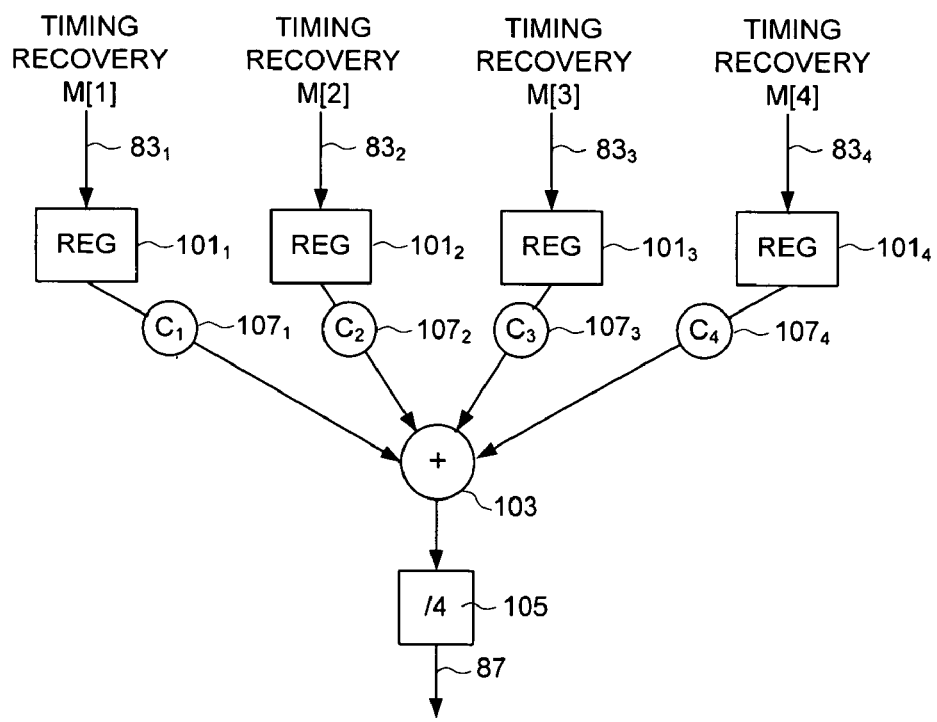
FIG. 9C shows an embodiment of the present invention wherein the timing recovery measurements generated for the sync marks in a spiral track crossing are weighted and then averaged.

In one example embodiment, the timing recovery filter 85 outputs the filtered timing recovery measurement 87 after detecting all of the sync marks in a spiral track crossing and in response to the corresponding coarse timing recovery measurements 83. The timing recovery filter 85 then outputs a single filtered timing recovery measurement 87 that is combined 89 with the fine timing recovery measurement 91 for the entire spiral track crossing. FIG. 9B shows an example embodiment of the timing recovery filter 85 that outputs an average of the coarse timing recovery measurements $83_1$-$83_4$ which are loaded into respective registers $101_1$-$101_4$, summed at adder 103, and divided by 4 at divider 105. FIG. 9C shows an example embodiment of the timing recovery filter 85 that outputs a weighted average by multiplying the coarse timing recovery measurements $83_1$-$83_4$ by respective weights $107_1$-$107_4$. In one embodiment, the weights $107_1$-$107_4$ are selected relative to a reliability of the respective timing recovery measurements $83_1$-$83_4$, for example, assigning a higher weight to the middle sync marks or to the sync marks having a higher signal quality as described above. In the example embodiments of FIGS. 9B and 9C, the fine timing recovery circuit 95 comprises a suitable delay circuit for delaying the output of the fine timing recovery measurement 91 until the filtered timing recovery measurement 87 has been generated for the spiral track crossing.

Figure 10:
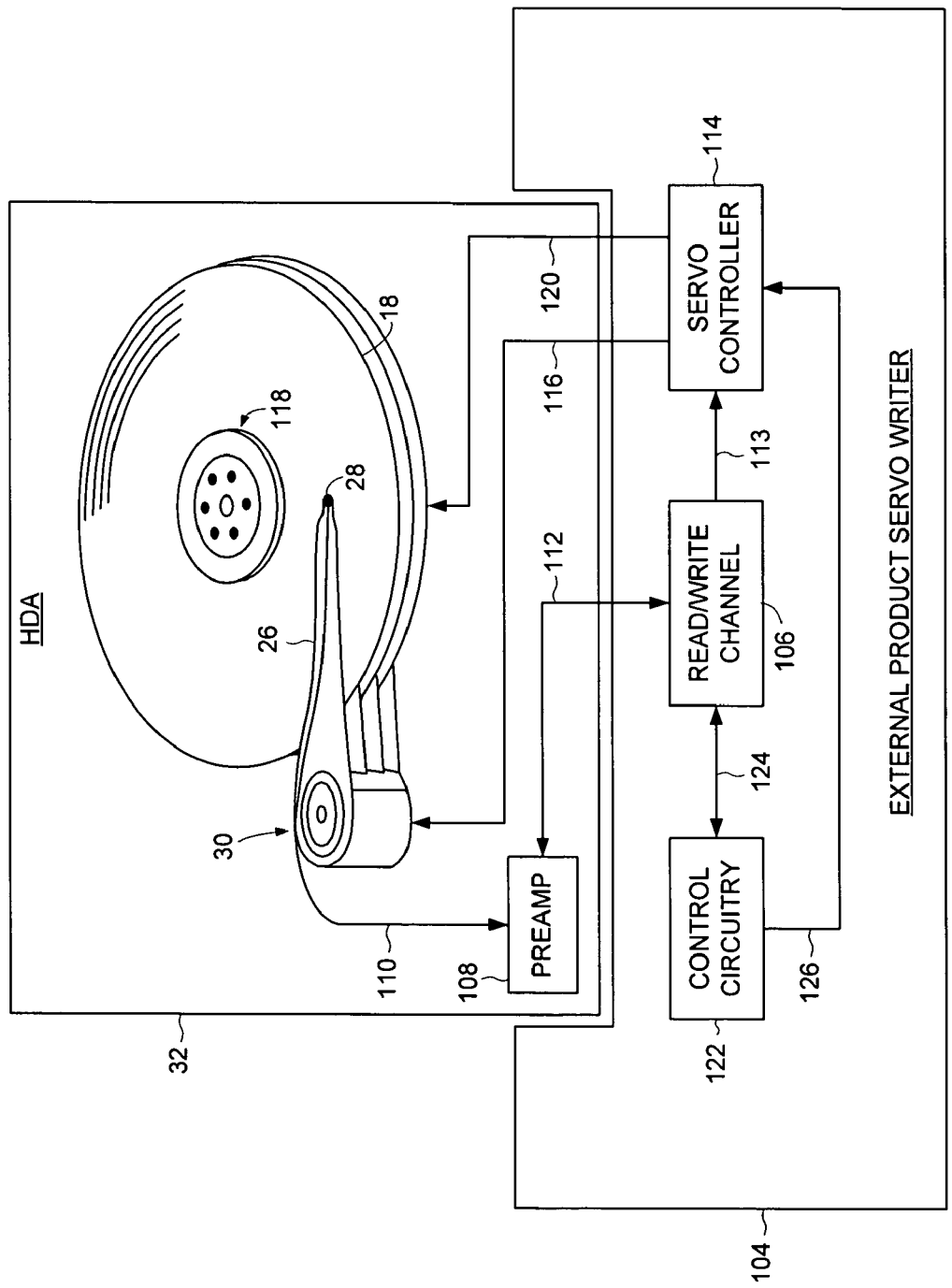
FIG. 10 shows an embodiment of the present invention wherein an external product servo writer is used to process the spiral tracks in order to write the product servo sectors to the disk.
Figure 11:
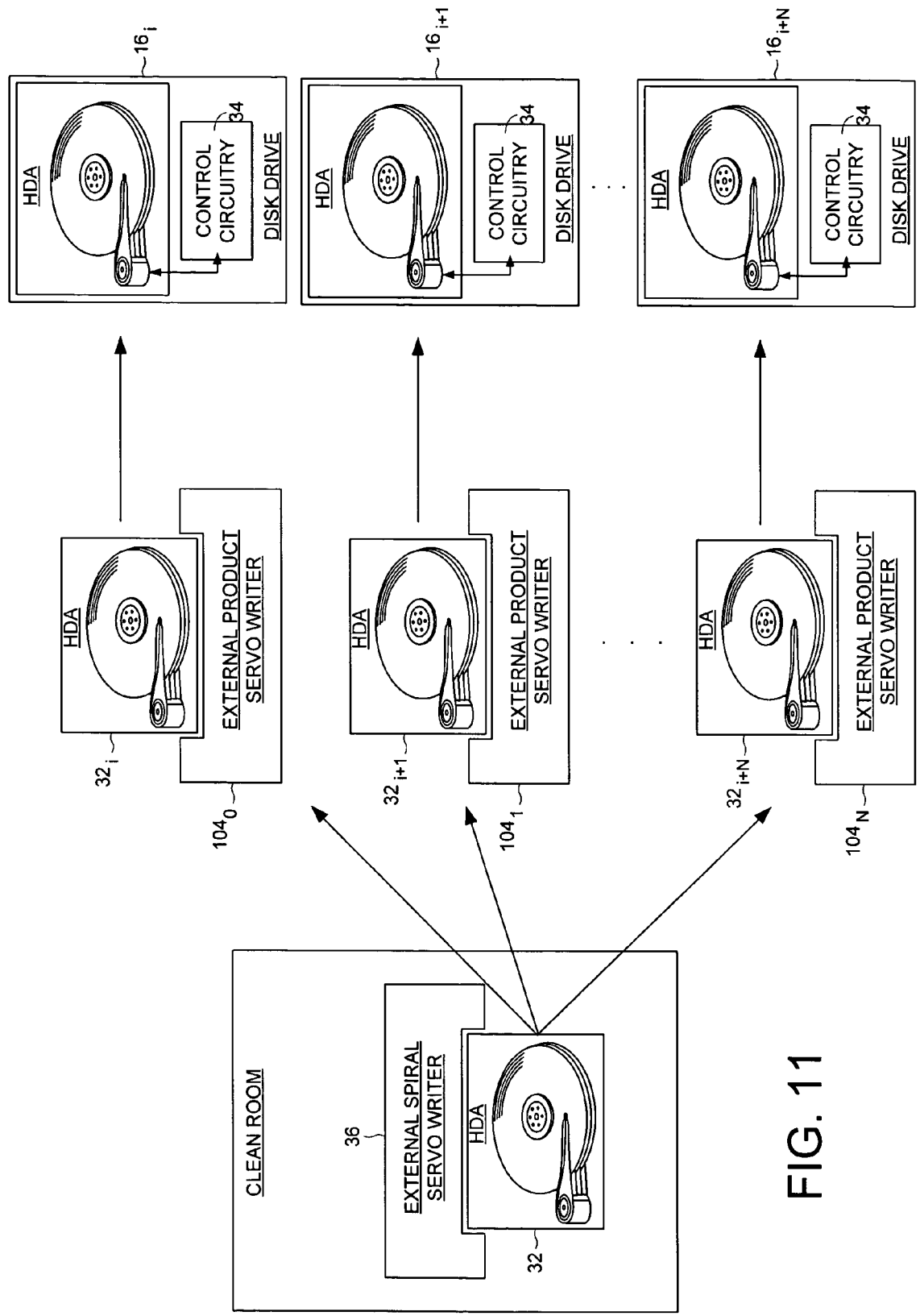
FIG. 11 shows an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 1 10 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 12:
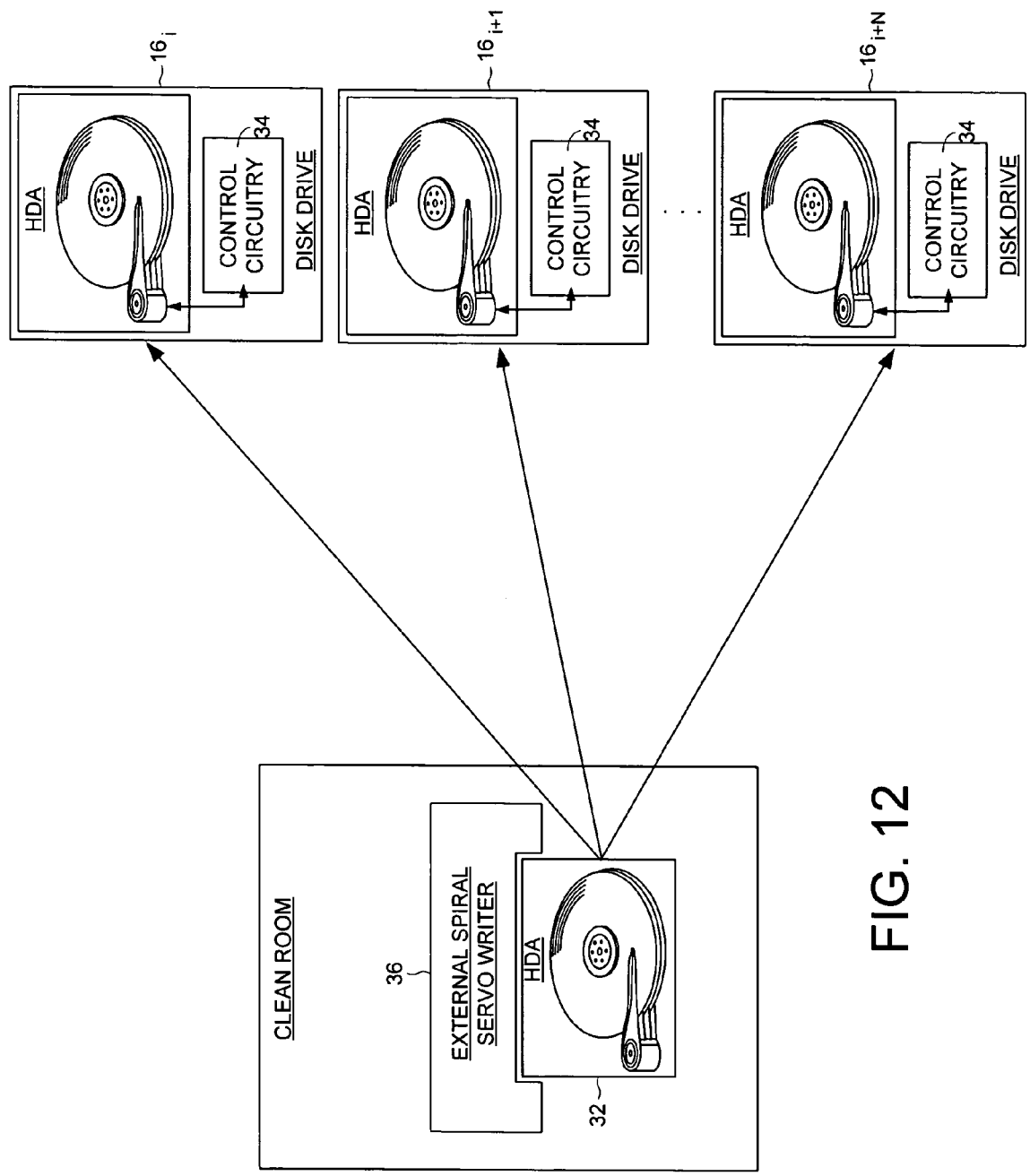
FIG. 12 shows an embodiment of the present invention wherein an external spiral servo writer is used to write the spiral tracks, and the control circuitry within each product disk drive is used to write the product servo sectors.

In one embodiment, the external product servo writer 104 of FIG. 10 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 11, a plurality of external product servo writers $104_0$-$104_N$ process the HDAs $32_{i-i+N}$ output by an external spiral servo writer 36 in order to write the product servo sectors less expensively and more efficiently than a conventional servo writer. In an alternative embodiment shown in FIG. 12, an external spiral servo writer 36 or an external media writer is used to write the spiral tracks, and the control circuitry 34 within each product disk drive $16_0$-$16_N$ is used to write the product servo sectors.

We claim:

1. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising:

using the head internal to the disk drive to read the spiral tracks to generate a read signal;

processing the read signal to detect a plurality of the sync marks in a spiral track crossing;
selecting one out of the plurality of detected sync marks based on a reliability of the detected sync marks;
generating a timing recovery measurement in response to the selected sync mark;
synchronizing a servo write clock in response to the timing recovery measurement;
processing the read signal representing the high frequency signal in the spiral track crossing to generate a position error signal (PES) used to maintain the head along a substantially circular target path; and
using the servo write clock and the head internal to the disk drive to write the product servo sectors along the circular target path.

2. The method as recited in claim 1, wherein:
two sync marks are detected in the spiral track crossing; and
the sync mark that generates the highest amplitude read signal is selected as having the high reliability.

3. The method as recited in claim 1, wherein:
three sync marks are detected in the spiral track crossing; and
the second sync mark is selected as having the high reliability.

4. The method as recited in claim 1, wherein:
four sync marks are detected in the spiral track crossing;
a timing recovery measurement is generated for at least the second and third sync marks; and
one of the second and third sync marks is selected as having the high reliability based on the timing recovery measurements.

5. The method as recited in claim 4, wherein the sync mark that generates the minimum timing recovery measurement is selected as having the high reliability.

6. A disk drive comprising:
(a) a disk comprising a plurality of spiral tracks, wherein each spiral track comprises a high frequency signal interrupted at a predetermined interval by a sync mark;
(b) an actuator arm;
(c) a head connected to a distal end of the actuator arm;
(d) a voice coil motor for rotating the actuator arm about a pivot to position the head radially over the disk; and
(e) control circuitry for writing a plurality of product servo sectors to the disk to define a plurality of radially spaced, concentric data tracks by:
using the head internal to the disk drive to read the spiral tracks to generate a read signal;
processing the read signal to detect a plurality of the sync marks in a spiral track crossing;
selecting one out of the plurality of detected sync marks based on a reliability of the detected sync marks;
generating a timing recovery measurement in response to the selected sync mark;
synchronizing a servo write clock in response to the timing recovery measurement;
processing the read signal representing the high frequency signal in the spiral track crossing to generate a position error signal (PES) used to maintain the head along a substantially circular target path; and
using the servo write clock and the head internal to the disk drive to write the product servo sectors along the circular target path.

7. The disk drive as recited in claim 6, wherein:
two sync marks are detected in the spiral track crossing; and
the sync mark that generates the highest amplitude read signal is selected as having the high reliability.

8. The disk drive as recited in claim 6, wherein:
three sync marks are detected in the spiral track crossing; and
the second sync mark is selected as having the high reliability.

9. The disk drive as recited in claim 6, wherein:
four sync marks are detected in the spiral track crossing;
a timing recovery measurement is generated for at least the second and third sync marks; and
one of the second and third sync marks is selected as having the high reliability based on the timing recovery measurements.

10. The disk drive as recited in claim 9, wherein the sync mark that generates the minimum timing recovery measurement is selected as having the high reliability.

11. A method of writing product servo sectors to a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the disk comprising a plurality of spiral tracks, wherein each spiral track comprises a high frequency signal interrupted at a predetermined interval by a sync mark, the method comprising:
using the head internal to the disk drive to read the spiral tracks to generate a read signal;
processing the read signal to detect a plurality of the sync marks in a spiral track crossing;
generating a plurality of timing recovery measurements corresponding to the plurality of detected sync marks;
filtering the plurality of timing recovery measurements to generate a filtered timing recovery measurement;
processing the high frequency signal in the spiral track crossing to generate a fine timing recovery measurement;
combining the fine timing recovery measurement with the filtered timing recovery measurement to generate a combined timing recovery measurement;
synchronizing a servo write clock in response to the combined timing recovery measurement;
processing the read signal representing the high frequency signal in the spiral track crossing to generate a position error signal (PES) used to maintain the head along a substantially circular target path; and
using the servo write clock and the head internal to the disk drive to write the product servo sectors along the circular target path.

12. The method as recited in claim 11, wherein filtering the plurality of timing recovery measurements comprises computing an average of the timing recovery measurements for the spiral track crossing.

13. The method as recited in claim 11, wherein filtering the plurality of timing recovery measurements comprises computing a weighted average of the timing recovery measurements for the spiral track crossing.

14. A disk drive comprising:
(a) a disk comprising a plurality of spiral tracks, wherein each spiral track comprises a high frequency signal interrupted at a predetermined interval by a sync mark;
(b) an actuator arm;
(c) a head connected to a distal end of the actuator arm;
(d) a voice coil motor for rotating the actuator arm about a pivot to position the head radially over the disk; and (e) control circuitry for writing a plurality of product servo sectors to the disk to define a plurality of radially spaced, concentric data tracks by:

using the head internal to the disk drive to read the spiral tracks to generate a read signal;

processing the read signal to detect a plurality of the sync marks in a spiral track crossing;

generating a plurality of timing recovery measurements corresponding to the plurality of detected sync marks;

filtering the plurality of timing recovery measurements to generate a filtered timing recovery measurement;

processing the high frequency signal in the spiral track crossing to generate a fine timing recovery measurement;

combining the fine timing recovery measurement with the filtered timing recovery measurement to generate a combined timing recovery measurement;

synchronizing a servo write clock in response to the combined timing recovery measurement;

processing the read signal representing the high frequency signal in the spiral track crossing to generate a position error signal (PES) used to maintain the head along a substantially circular target path; and using the servo write clock and the head internal to the disk drive to write the product servo sectors along the circular target path.

15. The disk drive as recited in claim 14, wherein the control circuitry filters the timing recovery measurements by computing an average of the timing recovery measurements for the spiral track crossing.

16. The disk drive as recited in claim 14, wherein the control circuitry filters the timing recovery measurements by computing a weighted average of the timing recovery measurements for the spiral track crossing.

* * * * *